US010944322B1

(12) United States Patent
Volk et al.

(10) Patent No.: US 10,944,322 B1
(45) Date of Patent: Mar. 9, 2021

(54) ADAPTIVE ON-TIME DC-TO-DC BUCK REGULATORS WITH CONSTANT SWITCHING FREQUENCY

(71) Applicant: KINETIC TECHNOLOGIES, San Jose, CA (US)

(72) Inventors: Karl Richard Volk, Scotts Valley, CA (US); Sofjan Goenawan, Cupertino, CA (US)

(73) Assignee: Kinetic Technologies, San Jose, CA (US)

( * ) Notice: Subject to any disclaimer, the term of this patent is extended or adjusted under 35 U.S.C. 154(b) by 0 days.

(21) Appl. No.: 16/662,626

(22) Filed: Oct. 24, 2019

(51) Int. Cl.
 *H02M 3/158* (2006.01)
 *H02M 3/157* (2006.01)
 *H02M 1/08* (2006.01)

(52) U.S. Cl.
 CPC .............. *H02M 3/158* (2013.01); *H02M 1/08* (2013.01); *H02M 3/157* (2013.01)

(58) Field of Classification Search
 CPC ........ H02M 1/08; H02M 1/088; H02M 3/156; H02M 3/157; H02M 3/158; H02M 3/1582; H02M 3/1586
 See application file for complete search history.

(56) References Cited

U.S. PATENT DOCUMENTS

| 7,298,119 B1* | 11/2007 | Amram Summit ......................... H02M 3/1582 323/225 |
| 2016/0301307 A1* | 10/2016 | Huang ..................... H02M 1/08 |
| 2019/0013733 A1* | 1/2019 | Trichy .................. H02M 1/088 |

OTHER PUBLICATIONS

PCT International Search Report and the Written Opinion dated Nov. 23, 2020, issued in related International Application No. PCT/US2020/057211 (6 pages).

\* cited by examiner

*Primary Examiner* — Matthew V Nguyen
(74) *Attorney, Agent, or Firm* — Sheppard Mullin Richter & Hampton LLP

(57) ABSTRACT

Voltage regulator circuits and methods therefor provided. In some embodiments, a voltage regulator circuit comprises: a first switch coupled to a power input; a second switch coupled to the first switch; a switching node between the first switch and the second switch; an inductor coupled between the switching node and an output node; a capacitor coupled between the output node and ground; a driver configured to operate the first and second switches according to a pulse-width-modulated (PWM) signal; a PWM circuit configured to generate the PWM signal based on at least an error signal; and a phase detector configured to generate the error signal based on a phase difference between the PWM signal and a clock reference signal.

20 Claims, 8 Drawing Sheets

_US 10,944,322 B1_

ADAPTIVE ON-TIME DC-TO-DC BUCK REGULATORS WITH CONSTANT SWITCHING FREQUENCY

TECHNICAL FIELD

This disclosure generally relates to voltage regulators, and more specifically, relates to adaptive on-time buck DC-to-DC regulators.

BACKGROUND

Adaptive on-time buck regulators possess a number of advantages. One advantage of these regulators is their fast transient response. However, due to process variations, the switching frequencies of these regulators may vary significantly. These variations include the on-resistance of field-effect transistors, and comparator mismatch, offset, and speed. Variations in the switching frequencies of +/−25% are commonly observed.

SUMMARY

In general, one aspect disclosed features a voltage regulator circuit comprising: a first switch coupled to a power input; a second switch coupled to the first switch; a switching node between the first switch and the second switch; an inductor coupled between the switching node and an output node; a capacitor coupled between the output node and ground; a driver configured to operate the first and second switches according to a pulse-width-modulated (PWM) signal; a PWM circuit configured to generate the PWM signal based on at least an error signal; and a phase detector configured to generate the error signal based on a phase difference between the PWM signal and a clock reference signal.

Embodiments of the voltage regulator circuit may include one or more of the following features. In some embodiments, the PWM circuit comprises: a feedback circuit configured to initiate on-times of the PWM signal based on a voltage at the switching node and a voltage at the output node; and an adaptive on-time circuit configured to terminate the on-times of the PWM signal based on the voltage at the output node and the error signal. In some embodiments, the adaptive on-time circuit comprises: an adjustable current source configured to provide an adjustable current having a magnitude based on the error signal; a capacitor coupled to the current source; and a comparator configured to terminate the on-times of the PWM signal based on the voltage at the output node and a voltage across the capacitor. In some embodiments, the adaptive on-time circuit further comprises: a control circuit configured to charge the capacitor when the on-times of the PWM signal begin. In some embodiments, the control circuit comprises: a switch configured to discharge the capacitor when the switch is closed; and an inverter configured to close the switch when the on-times of the PWM signal end. In some embodiments, the adjustable current source is further configured to increase the magnitude of the adjustable current responsive to a pulse of the reference clock signal occurring before a corresponding pulse of the PWM signal; and the adjustable current source is further configured to decrease the magnitude of the adjustable current responsive to a pulse of the reference clock signal occurring after a corresponding pulse of the PWM signal. In some embodiments, the adaptive on-time circuit further comprises: a fixed current source coupled to the capacitor, wherein the fixed current source is configured to provide a fixed current having a fixed magnitude; wherein the adjustable current source is configured to increase the magnitude of the adjustable current by a fixed percentage of the fixed magnitude; and wherein the adjustable current source is configured to decrease the magnitude of the adjustable current by the fixed percentage of the fixed magnitude. In some embodiments, the fixed percentage is approximately 15%. In some embodiments, the feedback circuit comprises: a ramp generator configured to generate voltage ramps based on voltages across the inductor; and a comparator circuit configured to initiate the on-times of the PWM signal based on the voltage ramps and the voltage at the output node. In some embodiments, the phase detector comprises: a first D flip-flop having a logic "1" as a D input, the reference clock signal as a clock input, and a reset signal as a reset input; a second D flip-flop having a logic "1" as a D input, the PWM signal as a clock input, and the reset signal as a reset input; and an AND gate, wherein the Q outputs of the first and second D flip-flops are inputs to the AND gate, wherein the reset signal is an output of the AND gate; wherein the error signal comprises the Q outputs of the first D flip-flop and the second D flip-flop; wherein the adjustable current source increases the magnitude of the adjustable current responsive to the Q output of the first D flip-flop being a logic "1"; and wherein the adjustable current source decreases the magnitude of the adjustable current responsive to the Q output of the second D flip-flop being a logic "1". In some embodiments, the phase detector comprises: a divide-by-two circuit configured to divide-by-two the PWM signal and the reference clock signal; and an exclusive-or gate, wherein the divided-by-two PWM signal and the divided-by-two reference clock signal are inputs to the exclusive-or gate, and wherein the error signal is an output of the exclusive-or gate.

In general, one aspect disclosed features a method for voltage regulation in a voltage regulator comprising a first switch coupled to a power input, a second switch coupled to the first switch, a switching node between the first switch and the second switch, and an inductor coupled between the switching node and an output node, the method comprising: operating the first and second switches according to a pulse-width-modulated (PWM) signal; generating the PWM signal based on at least an error signal; and generating the error signal based on a phase difference between the PWM signal and a clock reference signal.

Embodiments of the method may include one or more of the following features. Some embodiments comprise initiating on-times of the PWM signal based on a voltage at the switching node and a voltage at the output node; and terminating the on-times of the PWM signal based on the voltage at the output node and the error signal. Some embodiments comprise providing an adjustable current to a capacitor, the adjustable current having a magnitude based on the error signal; and terminating the on-times of the PWM signal based on the voltage at the output node and a voltage across the capacitor. Some embodiments comprise discharging the capacitor when the on-times of the PWM signal end. Some embodiments comprise charging the capacitor when the on-times of the PWM signal begin. Some embodiments comprise increasing the magnitude of the adjustable current responsive to a pulse of the reference clock signal occurring before a corresponding pulse of the PWM signal; and decreasing the magnitude of the adjustable current responsive to a pulse of the reference clock signal occurring after a corresponding pulse of the PWM signal. Some embodiments comprise providing a fixed current to the capacitor, the fixed current having a fixed magnitude;

increasing the magnitude of the adjustable current by a fixed percentage of the fixed magnitude; and decreasing the magnitude of the adjustable current by the fixed percentage of the fixed magnitude. In some embodiments, the fixed percentage is approximately 15%. Some embodiments comprise generating voltage ramps based on voltages across the inductor; and initiating the on-times of the PWM signal based on the voltage ramps and the voltage at the output node.

DETAILED DESCRIPTION

Some embodiments of the present disclosure of the described technology provide adaptive on-time buck regulators with constant switching frequency. The disclosed regulators feature first-order phase-lock loops (PLL) to ensure the stability of the switching frequencies. Within a regulator, a PLL generates an error signal that represents a phase difference between a reference clock signal and the pulse-width modulated signal used to operate the switches of the regulator.

Exemplary adaptive on-time buck regulators are disclosed in US patent publication number 2019/0131873, filed Apr. 27, 2018, entitled "SYSTEMS AND METHODS FOR PROVIDING INTELLIGENT CONSTANT ON-TIME CONTROL," the disclosure thereof incorporated by reference herein in its entirety for all purposes.

Figure 1:
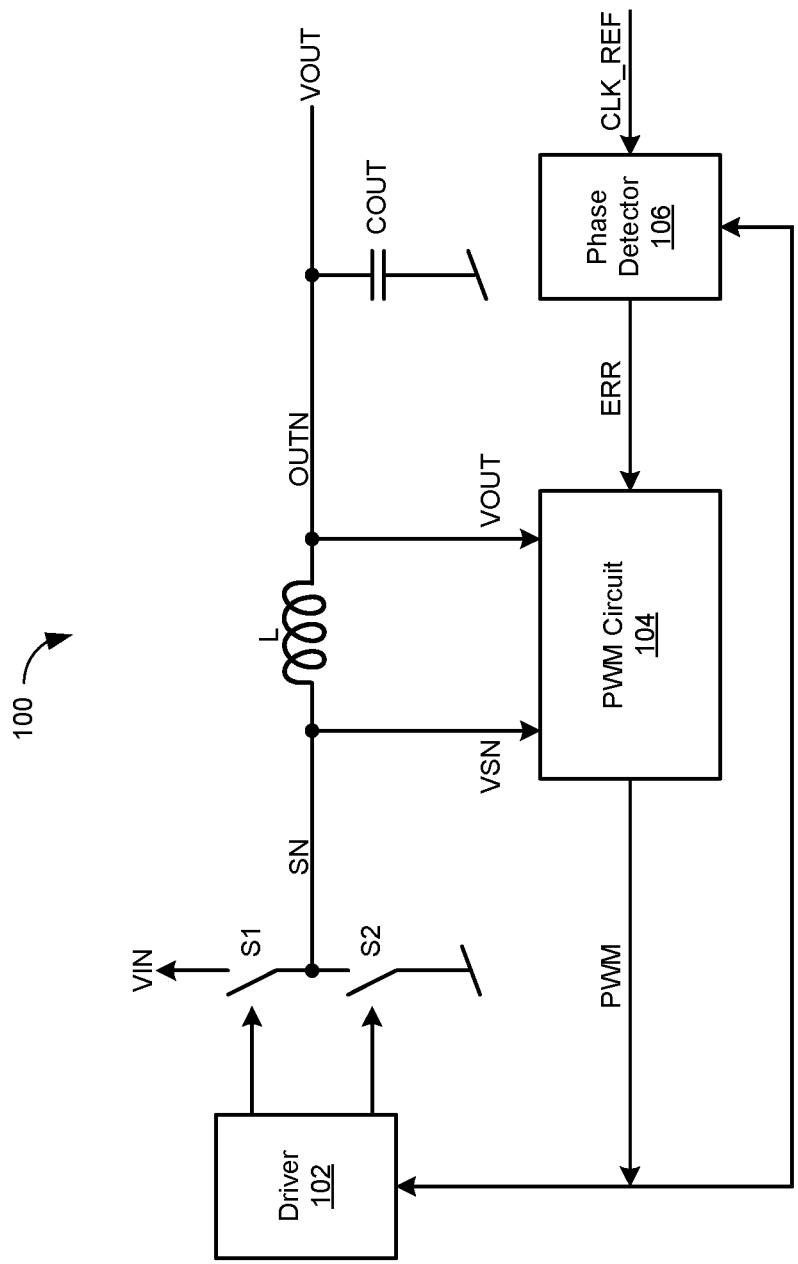
FIG. 1 illustrates an adaptive on-time buck regulator with constant switching frequency according to some embodiments of the present disclosure.

FIG. 1 illustrates an adaptive on-time buck regulator 100 with constant switching frequency according to some embodiments of the present disclosure. Referring to FIG. 1, the regulator 100 may include a switch S1 coupled to a power input VIN, and a switch S2 coupled to the switch S1 at a switching node SN. The regulator 100 may include an inductor L coupled between the switching node SN and an output node OUTN of the regulator 100. The regulator 100 may include output capacitor COUT coupled between the output node OUTN and ground.

The regulator 100 may include a driver 102 that operates the switches S1 and S2 in accordance with a pulse-width modulated timing signal PWM. The regulator 100 may include a PWM circuit 104 to generate the timing signal PWM in accordance with an error signal ERR. In some embodiments, the PWM circuit 104 may generate the timing signal PWM based on one or both of a voltage VSN of the switching node SN, and an output voltage VOUT of the output node OUTN.

The regulator 100 may include a phase detector 106 that generates the error signal ERR. The error signal ERR may represent a phase difference between a clock reference signal CLK_REF and the timing signal PWM.

Together the PWM circuit 104 and the phase detector 106 form a phase-lock loop (PLL). The PLL may lock the rising edge of the timing signal PWM to the rising edge of the clock reference signal CLK_REF. In this manner, the switching frequency of the regulator 100 may be locked to the frequency of the clock reference signal CLK_REF. Accordingly, the switching frequency of the regulator 100 may be set and accurately maintained by setting the frequency of the clock reference signal CLK_REF.

Figure 2:
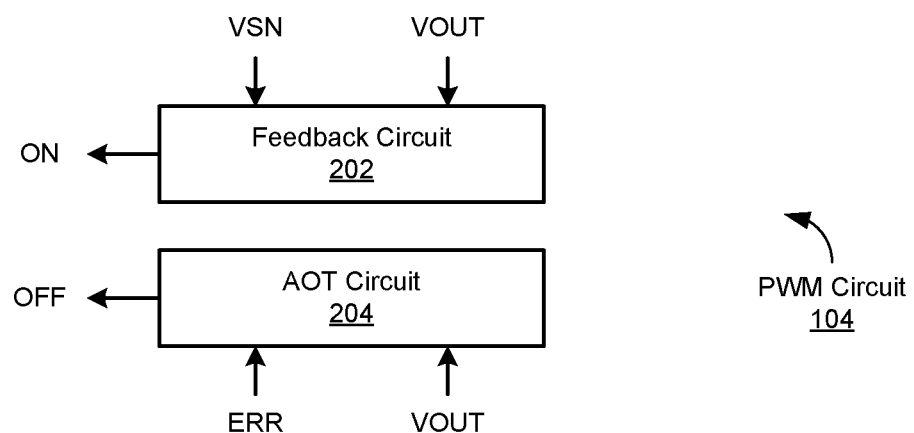
FIG. 2 illustrates detail of the PWM circuit of FIG. 1 according to some embodiments of the present disclosure.

FIG. 2 illustrates detail of the PWM circuit 104 of FIG. 1 according to some embodiments of the present disclosure. Referring to FIG. 2, the PWM circuit 104 may include a feedback circuit 202. The feedback circuit 202 may generate a signal ON based on one or both of the voltage VSN of the switching node SN, and the output voltage VOUT of the output node OUTN. The signal ON may be used to initiate an on-time of the signal PWM.

The PWM circuit 104 may include an adaptive on-time (AOT) circuit 204. The AOT circuit 204 may generate a signal OFF based on the output voltage VOUT of the output node OUTN, and the error signal ERR generated by the phase detector 106. The signal OFF may be used to terminate an on-time of the signal PWM. Together the signals ON and OFF may be used to set an on-time of the signal PWM, as described in detail below.

Figure 3:
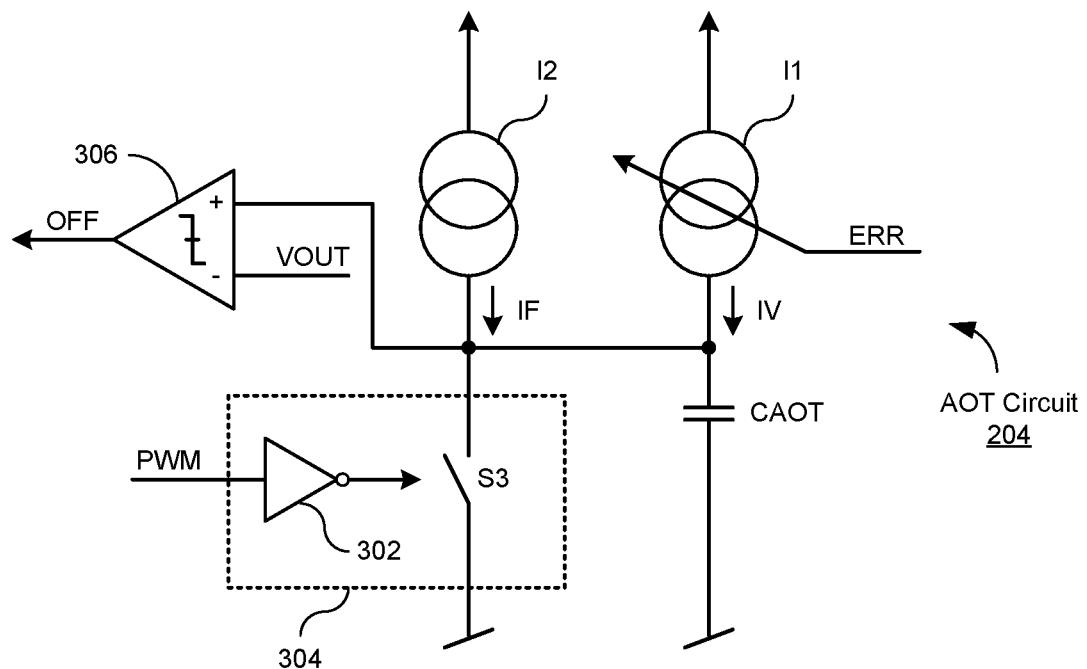
FIG. 3 illustrates detail of the AOT circuit of FIG. 2 according to some embodiments of the present disclosure.

FIG. 3 illustrates detail of the AOT circuit 204 of FIG. 2 according to some embodiments of the present disclosure. Referring to FIG. 3, the AOT circuit 204 may include an adjustable current source I1. The adjustable current source I1 may provide a variable current IV in accordance with the error signal ERR generated by the phase detector 106. That is, the variable current IV may have a magnitude that is determined by the error signal ERR.

The AOT circuit 204 may include a capacitor CAOT that is charged by the variable current IV. The AOT circuit 204 may include a comparator 306. The comparator 306 may assert the signal OFF when a voltage across the capacitor CAOT exceeds output voltage VOUT of the regulator 100.

In some embodiments, the AOT circuit 204 may include a control circuit 304. The control circuit 304 may discharge the capacitor CAOT during the off-time of the timing signal PWM. The control circuit 304 may include an inverter 302 and a switch S3. When the timing signal PWM goes high, the inverter 302 opens the switch S3, thereby discharging the capacitor CAOT.

In some embodiments, the AOT circuit 204 may include a fixed current source I2. The fixed current source IF may provide a fixed current IF, that is, a current having a fixed magnitude. In these embodiments, the capacitor CAOT may be charged by both the fixed current IF and the variable current IV.

Figure 4:
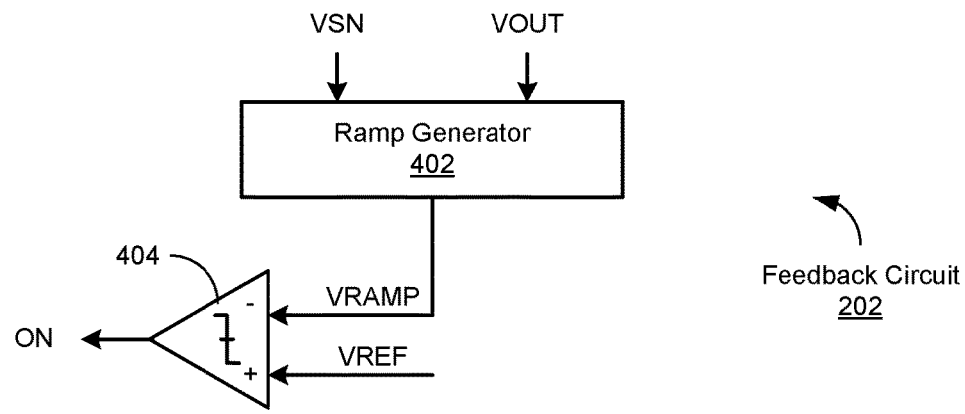
FIG. 4 illustrates detail of the feedback circuit of FIG. 2 according to some embodiments of the present disclosure.

FIG. 4 illustrates detail of the feedback circuit 202 of FIG. 2 according to some embodiments of the present disclosure. Referring to FIG. 4, the feedback circuit 202 may include a ramp generator 402. The ramp generator 402 may generate voltage ramps VRAMP based on voltages across the inductor L. The ramp generator 402 may generate the voltage ramps VRAMP according to a difference between the voltage VSN of the switching node SN, and the output voltage VOUT of the output node OUTN. The feedback circuit 202 may include a comparator 404. The comparator 404 may generate the signal ON when the ramp voltage VRAMP falls below a reference voltage VREF.

Figure 5:
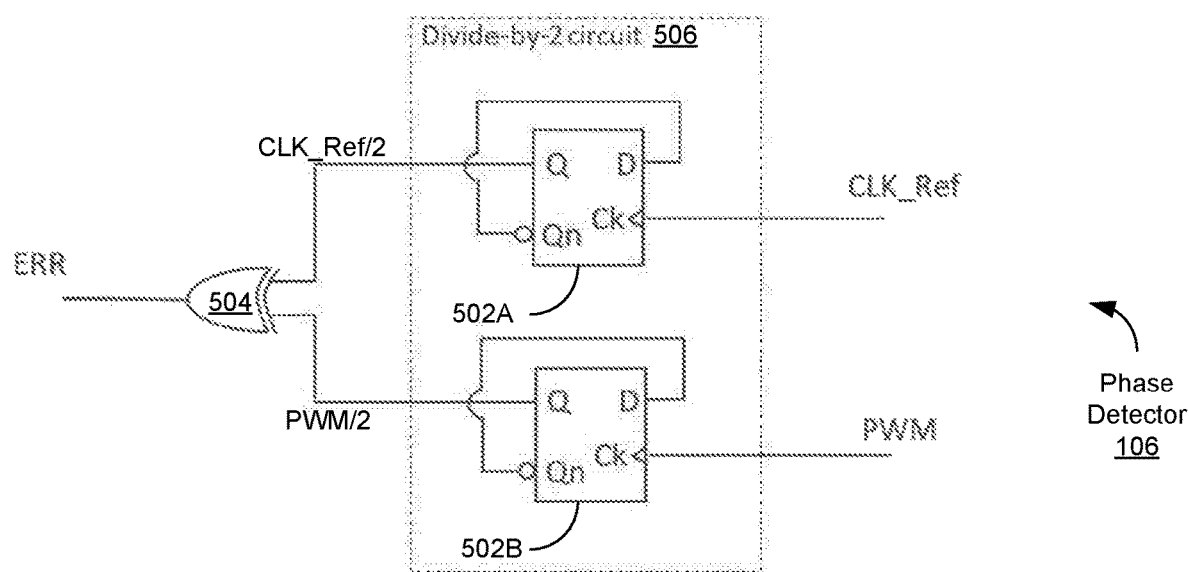
FIG. 5 illustrates detail of the phase detector of FIG. 1 according to some embodiments of the present disclosure.

FIG. 5 illustrates detail of the phase detector 106 of FIG. 1 according to some embodiments of the present disclosure. Referring to FIG. 5, the phase detector 106 may include an exclusive-or gate 504, and a divide-by-two circuit 506. The divide-by-two circuit 506 may include two D flip-flops 502A and 502B. In some embodiments, the exclusive-or gate 504 is replaced by an exclusive-nor gate 504. Each of the flip-flops 502 may receive its inverted output Qn as its D input. The flip-flop 502A may be clocked by the clock reference signal CLK_REF, while the flip flop 502B may be clocked by the timing signal PWM. The Q output of the flip-flop 502A is a signal CLK_REF/2 that has a 50% duty cycle regardless of the duty cycle of the clock reference signal CLK_REF. The Q output of the flip-flop 502B is a signal PWM/2 that has a 50% duty cycle regardless of the duty cycle of the timing signal PWM. The signals CLK_REF/2 and PWM/2 may be provided as inputs to the exclusive-or gate 504. The output ERR of the exclusive-or gate 504 may be a logical exclusive-or of the signals CLK_REF/2 and PWM/2.

The exclusive-or gate 504 responds to both rising and falling edges at its inputs. The divide-by-2 circuit 506 effectively locks the rising edge of the timing signal PWM to the rising edge of the clock reference signal CLK_REF, as explained above. The exclusive-or implementation can only provide uni-directional (i.e., increasing) frequency locking based on error signal ERR. The free running switching frequency (or unlocked frequency) is nominally set to be lower than clock reference frequency. Then the exclusive-or phase detector increases the switching frequency to lock with clock reference frequency CLK_REF.

Figure 6:
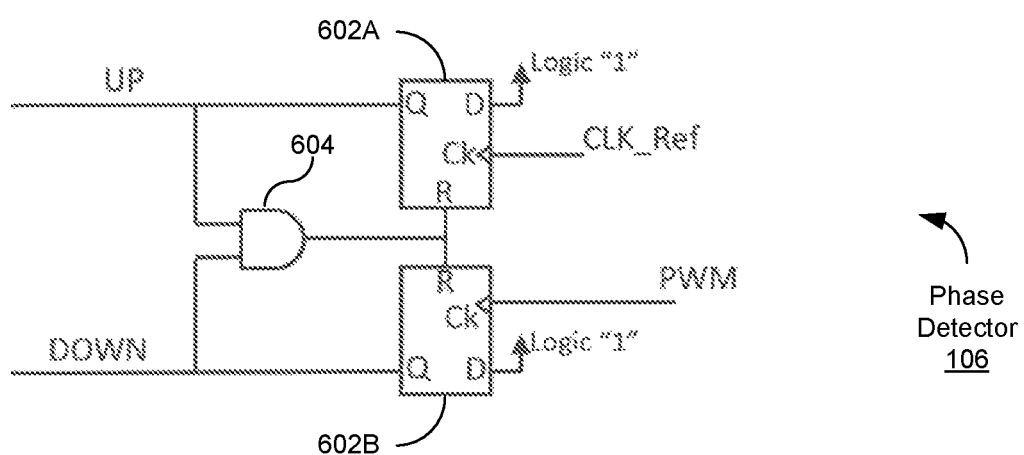
FIG. 6 illustrates detail of the phase detector of FIG. 1 according to other embodiments of the present disclosure.

FIG. 6 illustrates detail of the phase detector 106 of FIG. 1 according to some embodiments of the present disclosure. Referring to FIG. 6, the phase detector 106 may include two D flip-flops 602A and 602B, and an AND gate 604. Each of the flip-flops 602 may receive a logic "1" as the D input. The flip-flop 602A may be clocked by the clock reference signal CLK_REF, while the flip flop 602B may be clocked by the timing signal PWM. The Q output of the flip-flop 602A is an error signal UP. The Q output of the flip-flop 602B is an error signal DOWN. The error signals UP and DOWN may be provided as inputs to the AND gate 604. The output of the AND gate 604 may be a logical AND of the error signals UP and DOWN. The output of the AND gate 604 may be provided to the flip-flops 602A and 602B as reset signals.

The error signals UP and DOWN may be components of the error signal ERR. Referring again to FIG. 3, the error signal UP may be used to increase the variable current IV of the variable current source I1. Similarly, the error signal DOWN may be used to decrease the variable current IV of the variable current source I1.

Referring again to FIG. 3, in some embodiments, the magnitude of the variable current IV may be adjusted in fixed increments, with the magnitude of each increment being a fixed percentage a of the magnitude of the fixed current IF. This approach may generate high-frequency harmonics of the frequency of the clock reference signal CLK_REF. Furthermore, higher percentages a generate larger harmonics. Accordingly, there is a trade-off between lock range of the PLL and generation of harmonics. In some embodiments, the fixed percentage is α=15%. In these embodiments, the amplitude of the largest harmonic is less than 5% of the amplitude of the clock reference signal CLK_REF. These values work well in voltage regulator applications. However, other values may be chosen based on the application, and the desired characteristics of the application.

Figure 7:
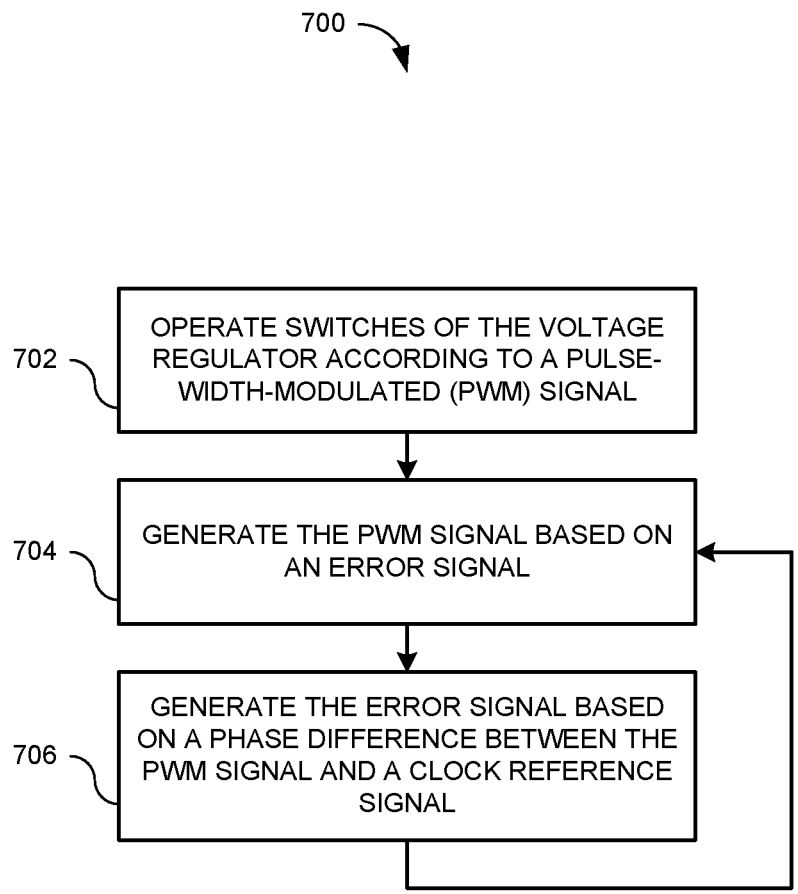
FIG. 7 illustrates a process for the switching voltage regulator of FIG. 1 according to embodiments of the present disclosure.

FIG. 7 illustrates a process 700 for the switching voltage regulator 100 of FIG. 1 according to embodiments of the present disclosure. Referring to FIG. 7, the switching voltage regulator 100 may operate switches in the voltage regulator according to a pulse-width modulated (PWM) signal, at 702. For example, referring to FIG. 1, the driver 102 may operate the switches S1 and S2 according to the timing signal PWM generated by the PWM circuit 104. For example, the driver 102 may close the switch S1 and open the switch S2 to couple the switching node SN to the power supply during an on-time of the regulator 100, and may open the switch S1 and close the switch S2 to couple the switching node SN to ground during an off-time of the regulator 100.

Referring again to FIG. 7, the switching voltage regulator 100 may generate the PWM signal based on an error signal, at 704. For example, referring to FIG. 1, the PWM circuit 104 may generate the timing signal PWM based on the error signal ERR generated by the phase detector 106. In some embodiments, the PWM circuit 110 may generate the timing signal PWM based on one or both of a voltage VSN of the switching node SN, and an output voltage VOUT of the output node OUTN.

Referring again to FIG. 7, the switching voltage regulator 100 may generate the error signal based on the phase difference between the PWM signal and a clock reference signal, at 706. For example, referring again to FIG. 1, the phase detector 106 may generate the error signal ERR based on the phase difference between the timing signal PWM and the clock reference signal CLK_REF. The process may then return to 704.

Figure 8:
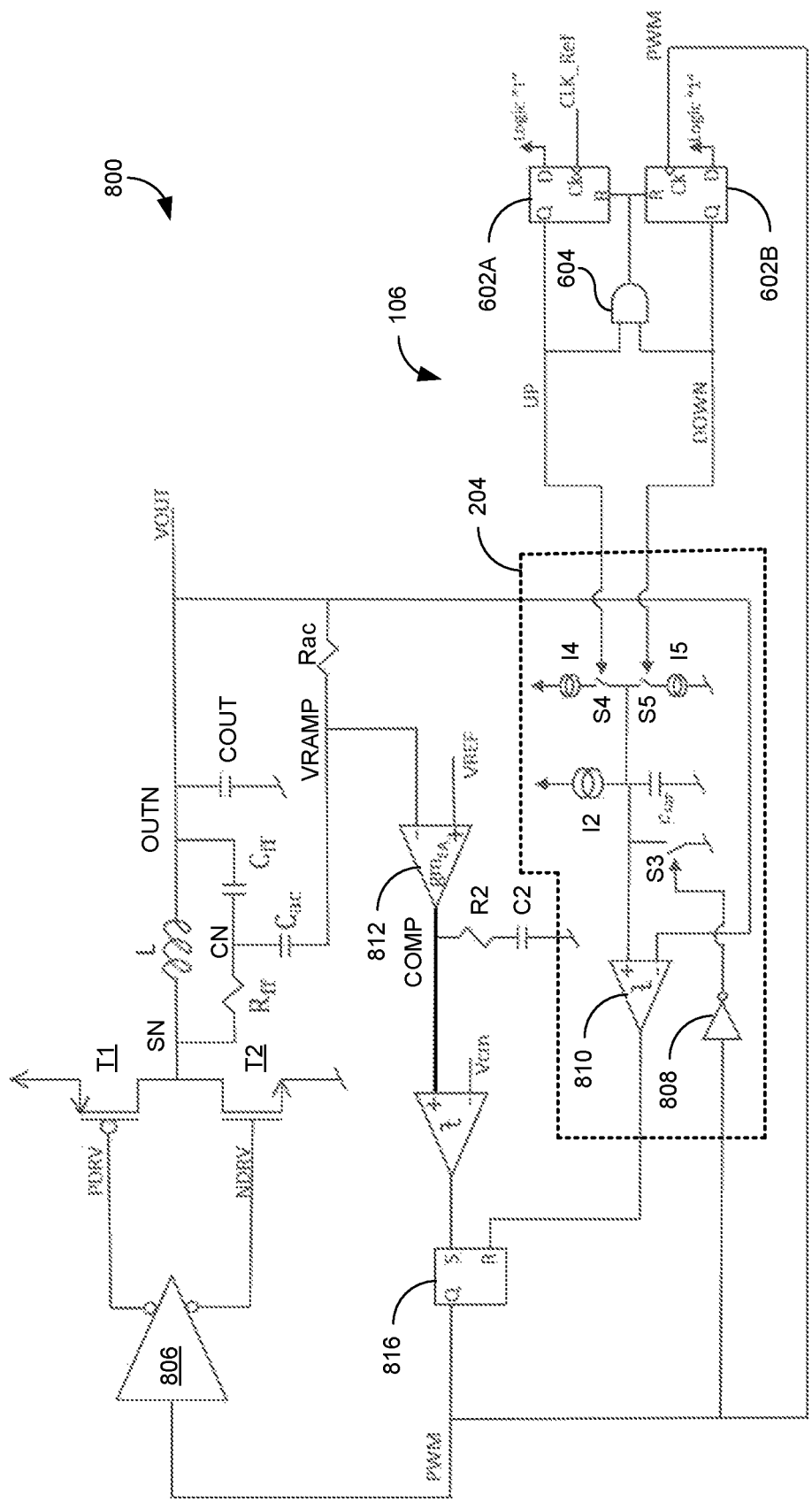
FIG. 8 illustrates an adaptive on-time buck regulator with constant switching frequency according to embodiments of the present disclosure.

FIG. 8 illustrates an adaptive on-time buck regulator 800 with constant switching frequency according to embodiments of the present disclosure. Referring to FIG. 8, a driver 806 may generate drive signals PDRV and NDRV in accordance with the timing signal PWM. The drive signal PDRV may operate a transistor T1 that is connected to a power input. The drive signal NDRV may operate a transistor T2 that is connected to ground. The transistors T1 and T2 may be connected to a switching node SN. For example, the transistor T1 may be turned on when the PDRV is a logic " ", such that the switch S1 is closed. The transistor T2 may be turned on when the NDRV is a logic "1", such that the switch S2 is closed. In some embodiments, the transistors T1 and T2 may be implemented as metal-oxide semiconductor field-effect transistors (MOSFET). In particular, the transistors T1 and T2 may be implemented as a PMOS transistor and an NMOS transistor, respectively.

An inductor L may be coupled between the switching node SN and an output node OUTN. An output capacitor COUT may be coupled between the output node OUTN and ground. The voltage regulator 800 may include a ramp circuit to generate ramp voltages VRAMP. The ramp circuit may include a resistor Rff, a capacitor Cff, and a capacitor Cac. The resistor Rff may be coupled between the switching node and a common node CN. The capacitor Cff may be coupled between the common node CN and the output node OUTN. The capacitor Cac may be coupled to the common node CN, and may provide the ramp voltage VRAMP at a node coupled to the output node OUTN by a resistor Rac. In some embodiments, the parameters of the components may be Rff=500 kiloOhms, Cff=30 picoFarad, Cac=20 picoFarad, and Rac=250 kiloOhms. In these embodiments, the voltage VRAMP may have an amplitude of approximately 30 mV, with an average voltage of approximately VOUT.

The ramp voltage VRAMP, and the output voltage VOUT, may be provided to an inverting input of an error amplifier 812 having an output coupled to ground by a resistor Rc and a capacitor Cc in series. In some embodiments, a transconductance of the error amplifier 812 may be approximately gmEA=75 microSiemens, Rc=50 kiloOhms, and Cc=30 picoFarad. In such embodiments, Rc and Cc set up a zero frequency of F_zero=1/(2*pi*Rc*Cc)=106 kiloHertz, and the error amplifier 812 and Rc set up a gain at high frequency (higher than F_zero) of gmEA*Rc=3.75.

Based on the voltages VRAMP and VOUT, the error amplifier 812 may generate an error voltage COMP The error voltage COMP has an average value of approximately zero. In this manner, the error amplifier 812 regulates the output voltage VOUT to be the same as the reference voltage VREF.

A comparator 814 may compare the error voltage COMP with a common-mode voltage Vcm. A flip-flop 816 may receive an output of the comparator 814, and may provide the timing signal PWM as an output. When the magnitude of the error voltage COMP exceeds the magnitude of the common-mode voltage Vcm, the comparator 814 may set the flip-flop 816 to a logic "1", thereby initiating an on-time of the timing signal PWM.

The voltage regulator 800 of FIG. 8 may include the phase detector 106 of FIG. 6, and the AOT circuit 204 of FIG. 3. In the embodiment of FIG. 8, the variable current source I1 of FIG. 3 has been replaced by two current sources I4 and I5. The current sources I4 and I5 may be implemented in the same manner, and may provide current to the capacitor CAOT through switches S4 and S5, respectively. The switches S4 and S5 may operate according to the error signals UP and DOWN, respectively, provided by the phase detector 106. In particular, responsive to assertion of the error signal UP, the current source I4 may increase the current provided to the capacitor CAOT by a fixed percentage a of the current IF provided by the fixed current source I2. Responsive to assertion of the error signal DOWN, the current source I5 may decrease the current provided to the capacitor CAOT by the fixed percentage a of the current IF provided by the fixed current source I2.

The voltage regulator 800 may include a comparator 810. The currents provided by the current sources I2, I4, and I5 charge the capacitor CAOT. When a voltage across the capacitor CAOT exceeds the output voltage VOUT of the regulator 100, a comparator 810 may reset the flip-flop 816 to a logic "0", thereby terminating an on-time of the timing signal PWM.

The voltage regulator 800 may include an inverter 808 and a switch S3. When the timing signal PWM goes high, the inverter 808 opens the switch S3, thereby charging the capacitor CAOT.

Figure 9:
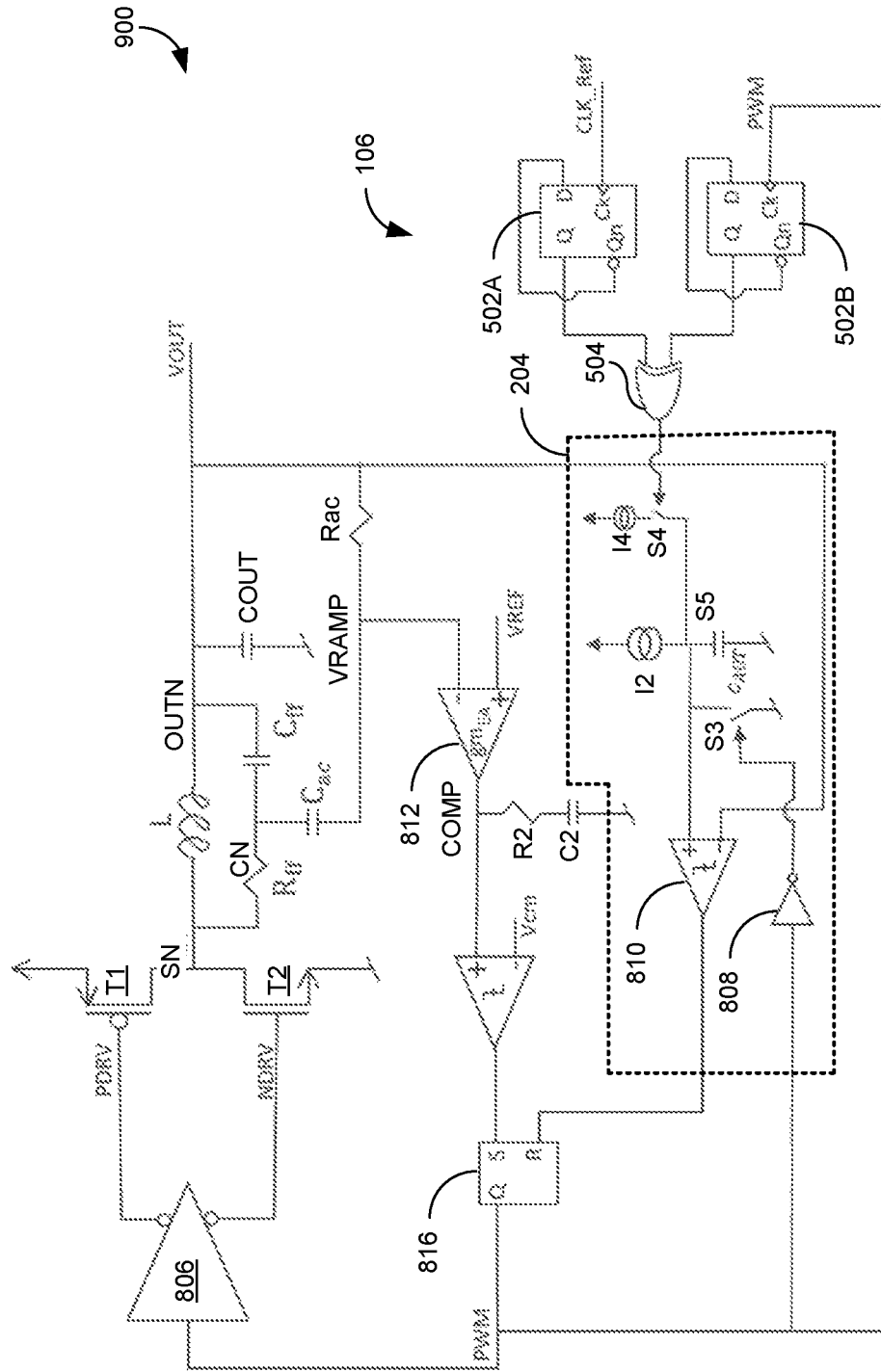
FIG. 9 illustrates an adaptive on-time buck regulator with constant switching frequency according to embodiments of the present disclosure.

FIG. 9 illustrates an adaptive on-time buck regulator 900 with constant switching frequency according to embodiments of the present disclosure. The regulator 900 of FIG. 9 is similar to the regulator 800 of FIG. 8, except the phase detector 106 is implemented as shown in FIG. 5. In the embodiment of FIG. 9, the variable current source I1 of FIG. 3 has been replaced by a current source I4. The current source I4 may be implemented in the same manner, and may provide current to the capacitor CAOT through a switch S4. The switch S4 may operate according to the error signal ERR provided by the phase detector 106. The currents provided by the current sources I2 and I4 charge the capacitor CAOT. When a voltage across the capacitor CAOT exceeds the output voltage VOUT of the regulator 100, the comparator 810 may reset the flip-flop 816 to a logic "0", thereby terminating an on-time of the timing signal PWM.

Figure 10:
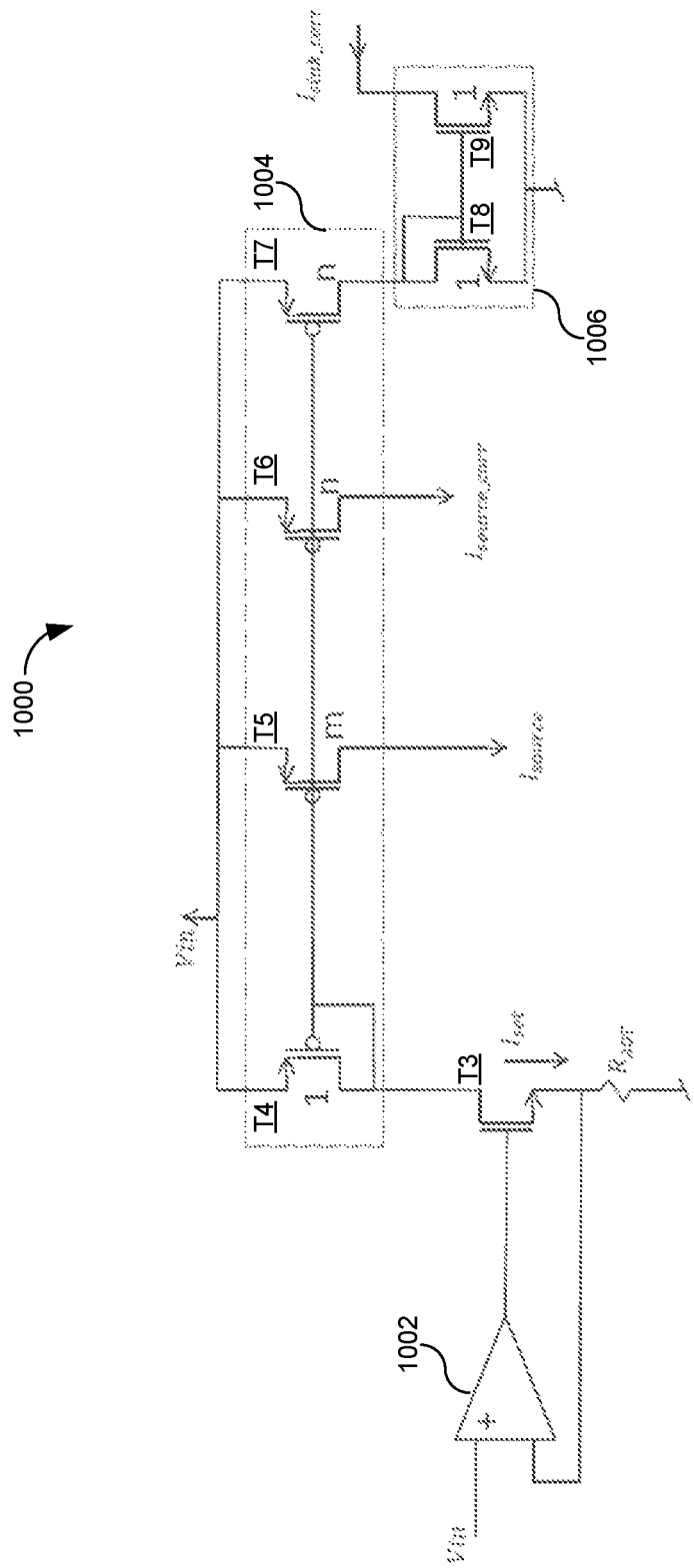
FIG. 10 illustrates a circuit for providing fixed and variable currents according to embodiments of the present disclosure.

FIG. 10 illustrates a circuit 1000 for providing fixed and variable currents according to embodiments of the present disclosure. Some or all of circuit 1000 may be used to implement the variable current source I1 and fixed current source I2 of FIG. 3, and the current sources I4 and I5 of FIG. 8. Referring to FIG. 10, the circuit 1000 generates a set current $I_{set}$. In particular, an operational amplifier 1002 receives a source voltage Vin at its positive input, and a feedback voltage at its negative input. An output of the operational amplifier 1002 is provided to a gate of an NMOS follower T3. A source of the NMOS follower T3 is coupled to ground by a resistor $R_{AOT}$, and provides the feedback voltage to the operational amplifier 1002. Therefore the set current is given by $$I_{SET} = \frac{Vin}{R_{AOT}}.$$

A drain of the NMOS follower T3 is coupled to an array of PMOS current mirrors 1004. Each transistor in the array of current mirrors 1004 may have a respective scaling factor. Referring to FIG. 10, the transistor T4 has a scaling factor of 1. The transistor T5 has a scaling factor of m, and may provide a source current given by $$I_{source} = m * \frac{Vin}{R_{AOT}}.$$

This source current may be used as the fixed current IF of FIG. 3 by setting m=1. The transistor T6 has a scaling factor of n, and may provide a source correction current given by $$I_{source\_corr} = n * \frac{Vin}{R_{AOT}}.$$

This source correction current may be used as the current provided by the current source I4 of FIG. 8 by setting n=a. The transistor T7 also has a scaling factor of n, and together with an NMOS current mirror 1006 comprising transistors T8 and T9, may provide a sink correction current given by $$I_{sink\_corr} = -n * \frac{Vin}{R_{AOT}}.$$

This sink correction current may be used as the current provided by the current source I5 of FIG. 8 by setting n=α.

Embodiments of the present disclosure provides several advantages over conventional approaches. In particular, the disclosed regulators feature PLLs that lock the switching frequency of the regulators to reference clock signals. Therefore the switching frequencies of the disclosed regulators may be controlled by controlling the frequencies of the reference clock signals. These techniques thereby provide switching voltage regulators having stable switching frequencies.

Spatially relative terms such as "under," "below," "lower," "over," "upper," and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc. and are also not intended to be limiting. Like terms refer to like elements throughout the description.

As used herein, the terms "having," "containing," "including," "comprising," and the like are open ended terms that indicate the presence of stated elements or features, but do not preclude additional elements or features. The articles "a," "an" and "the" are intended to include the plural as well as the singular, unless the context clearly indicates otherwise.

Although this invention has been disclosed in the context of certain implementations and examples, it will be understood by those skilled in the art that the present invention extends beyond the specifically disclosed implementations to other alternative implementations and/or uses of the invention and obvious modifications and equivalents thereof. Thus, it is intended that the scope of the present invention herein disclosed should not be limited by the particular disclosed implementations described above.

Furthermore, the skilled artisan will recognize the interchangeability of various features from different implementations. In addition to the variations described herein, other known equivalents for each feature can be mixed and matched by one of ordinary skill in this art to construct analogous systems and techniques in accordance with principles of the present invention.

It is to be understood that not necessarily all objects or advantages may be achieved in accordance with any particular implementation of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

What is claimed is:

1. A voltage regulator circuit comprising:
a first switch coupled to a power input;
a second switch coupled to the first switch;
a switching node between the first switch and the second switch;
an inductor coupled between the switching node and an output node;
a capacitor coupled between the output node and ground;
a driver configured to operate the first and second switches according to a pulse-width-modulated (PWM) signal;
a PWM circuit configured to generate the PWM signal based on at least an error signal;
a phase detector configured to generate the error signal based on a phase difference between the PWM signal and a clock reference signal;
a feedback circuit configured to initiate on-times of the PWM signal based on a voltage at the switching node and a voltage at the output node; and
an adaptive on-time circuit configured to terminate the on-times of the PWM signal based on the voltage at the output node and the error signal.

2. The circuit of claim 1, wherein the adaptive on-time circuit comprises:
an adjustable current source configured to provide an adjustable current having a magnitude based on the error signal;
a capacitor coupled to the current source; and
a comparator configured to terminate the on-times of the PWM signal based on the voltage at the output node and a voltage across the capacitor.

3. The circuit of claim 2, wherein:
the adjustable current source is further configured to increase the magnitude of the adjustable current responsive to a pulse of the reference clock signal occurring before a corresponding pulse of the PWM signal; and
the adjustable current source is further configured to decrease the magnitude of the adjustable current responsive to a pulse of the reference clock signal occurring after a corresponding pulse of the PWM signal.

4. The circuit of claim 3, wherein the adaptive on-time circuit further comprises:
a fixed current source coupled to the capacitor, wherein the fixed current source is configured to provide a fixed current having a fixed magnitude;
wherein the adjustable current source is configured to increase the magnitude of the adjustable current by a fixed percentage of the fixed magnitude; and
wherein the adjustable current source is configured to decrease the magnitude of the adjustable current by the fixed percentage of the fixed magnitude.

5. The circuit of claim 4, wherein:
the fixed percentage is approximately 15%.

6. The circuit of claim 1, wherein the adaptive on-time circuit further comprises:
a control circuit configured to charge the capacitor when the on-times of the PWM signal begin.

7. The circuit of claim 6, wherein the control circuit comprises:
a switch configured to discharge the capacitor when the switch is closed; and
an inverter configured to close the switch when the on-times of the PWM signal end.

8. The circuit of claim 1, wherein the feedback circuit comprises:
a ramp generator configured to generate voltage ramps based on voltages across the inductor; and
a comparator circuit configured to initiate the on-times of the PWM signal based on the voltage ramps and the voltage at the output node.

9. The circuit of claim 1, wherein the phase detector comprises:
a first D flip-flop having a logic "1" as a D input, a reference clock signal as a clock input, and a reset signal as a reset input;
a second D flip-flop having a logic "1" as a D input, the PWM signal as a clock input, and the reset signal as a reset input; and
an AND gate, wherein Q outputs of the first and second D flip-flops are inputs to the AND gate, wherein the reset signal is an output of the AND gate;
wherein the error signal comprises the Q outputs of the first D flip-flop and the second D flip-flop;
wherein an adjustable current source increases the magnitude of an adjustable current responsive to the Q output of the first D flip-flop being a logic "1"; and
wherein the adjustable current source decreases the magnitude of the adjustable current responsive to the Q output of the second D flip-flop being a logic "1".

10. The circuit of claim 1, wherein the phase detector comprises:
a divide-by-two circuit configured to divide-by-two the PWM signal and the reference clock signal; and
an exclusive-or gate, wherein the divided-by-two PWM signal and the divided-by-two reference clock signal are inputs to the exclusive-or gate, and wherein the error signal is an output of the exclusive-or gate.

11. A method for voltage regulation in a voltage regulator comprising a first switch coupled to a power input, a second switch coupled to the first switch, a switching node between the first switch and the second switch, and an inductor coupled between the switching node and an output node, the method comprising:
operating the first and second switches according to a pulse-width-modulated (PWM) signal;
generating the PWM signal based on at least an error signal;
generating the error signal based on a phase difference between the PWM signal and a clock reference signal;
initiating on-times of the PWM signal based on a voltage at the switching node and a voltage at the output node; and
terminating the on-times of the PWM signal based on the voltage at the output node and the error signal.

12. The method of claim 11, further comprising:
providing an adjustable current to a capacitor, the adjustable current having a magnitude based on the error signal; and
terminating the on-times of the PWM signal based on the voltage at the output node and a voltage across the capacitor.

13. The method of claim 12, further comprising:
discharging the capacitor when the on-times of the PWM signal end.

14. The method of claim 12, further comprising:
charging the capacitor when the on-times of the PWM signal begin.

15. The method of claim 12, further comprising:
increasing the magnitude of the adjustable current responsive to a pulse of the reference clock signal occurring before a corresponding pulse of the PWM signal; and
decreasing the magnitude of the adjustable current responsive to a pulse of the reference clock signal occurring after a corresponding pulse of the PWM signal.

16. The method of claim 15, further comprising:
providing a fixed current to the capacitor, the fixed current having a fixed magnitude;
increasing the magnitude of the adjustable current by a fixed percentage of the fixed magnitude; and
decreasing the magnitude of the adjustable current by the fixed percentage of the fixed magnitude.

17. The method of claim 16, wherein:
the fixed percentage is approximately 15%.

18. A method for voltage regulation in a voltage regulator comprising a first switch coupled to a power input, a second switch coupled to the first switch, a switching node between the first switch and the second switch, and an inductor coupled between the switching node and an output node, the method comprising:
operating the first and second switches according to a pulse-width-modulated (PWM) signal;
generating the PWM signal based on at least an error signal;
generating the error signal based on a phase difference between the PWM signal and a clock reference signal;
generating voltage ramps based on voltages across the inductor; and
initiating the on-times of the PWM signal based on the voltage ramps and the voltage at the output node.

19. The method of claim 18, further comprising:
initiating on-times of the PWM signal based on a voltage at the switching node and a voltage at the output node; and
terminating the on-times of the PWM signal based on the voltage at the output node and the error signal.

20. The method of claim 18, further comprising:
providing an adjustable current to a capacitor, the adjustable current having a magnitude based on the error signal; and
terminating the on-times of the PWM signal based on the voltage at the output node and a voltage across the capacitor.

* * * * *